United States Patent Office 3,250,690
Patented May 10, 1966

3,250,690
ELECTROLYTIC REDUCTIVE COUPLING OF CYANO COMPOUNDS
Manuel M. Baizer, St. Louis, Mo., assignor to Monsanto Company, a corporation of Delaware
No Drawing. Filed Dec. 23, 1963, Ser. No. 332,916
7 Claims. (Cl. 204—73)

This invention relates to the manufacture of polyfunctional compounds and more particularly provides a new and valuable electrolytic process for reductive coupling of cyanobutadienes.

An object of the invention is to provide a process for producing compounds convertible to sebaconitrile, 1,10-diaminodecane and sebacic acid. It is a further object of the invention to provide a process for converting 1-cyano-1,3-butadiene to 1,8-dicyano-octa-2,6-diene and other products resulting from reductive coupling. It is a further object to provide a process for converting 1-cyano-1,3-butadiene to 1,8-dicyano-octa-2,6-diene in good yield.

The process of the present invention can be pictured as follows:

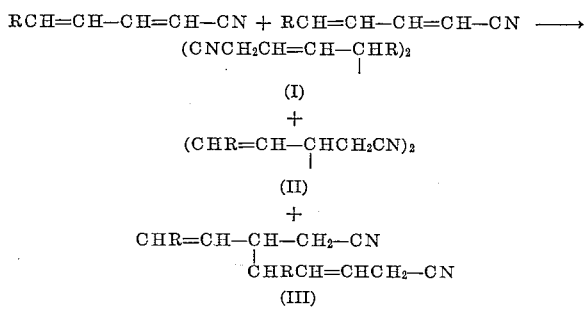

in which R represents hydrogen or saturated hydrocarbon.

When 1-cyano-1,3-butadiene is utilized in the process, the product is predominantly of the I type, 1,8-dicyano-octa-2,6-diene, accompanied by small amounts of the II type, 3,4-divinyladiponitrile and minor amounts of other products including hydrotetramers of the starting butadiene.

It will be understood that the R's in the above formulae can be the same or different and can be alkyl, cycloalkyl, or aryl hydrocarbon groups, preferably having no more than 10 carbon atoms, and that the cyano-butadiene can also have halogen or other substituents which do not markedly affect the conjugated unsaturation of the system. Aside from hydrogen, representative R's are methyl, ethyl, propyl, isopropyl, butyl, sec-butyl, amyl, isoamyl, hexyl, octyl, decyl, phenyl, o-tolyl, etc., which can be used singly, or in combination, such as hydrogen on one molecule and methyl on another, hydrogen on one and phenyl on a second, or hexyl on one and phenyl on a second, to obtain products resulting from reductive coupling as illustrated in the formulae above.

For purposes of illustration the reductive coupling of 1-cyano-1,3-butadiene with itself, i.e., hydrodimerization, as described herein, will serve to illustrate the principles and procedure of the present invention which can be applied to the other examples of cyanobutadiene reactants described herein.

In general, the electrolytic reductive coupling of the present invention is conducted in concentrated solution in an aqueous electrolyte. It is desirable to employ fairly concentrated solutions in order to minimize undesired reactions of intermediate ions with the water of the electrolyte. The olefinic reactants will ordinarily comprise at least about 10% by weight of the electrolyte, and preferably at least 20% by weight or more. It is generally desirable to employ fairly high concentrations of salts in the electrolyte, for example constituting 5% and usually 30% or more by weight of the total amount of salt and water in the electrolyte, in order to obtain the desired solubility of the olefinic compounds.

The hydrodimerization of alpha,beta-olefinic carboxylates, nitriles and carboxamides is taught in my copending applications S.N. 228,740, filed October 5, 1962, S.N. 145,-480 and 145,482, filed October 16, 1961, and S.N. 75,130, filed December 12, 1960, the disclosures of which are incorporated herein by reference; the aforesaid applications having been abandoned or forfeited in favor of continuation-in-part applications Serial No. 337,546, filed January 14, 1964 and now Patent Number 3,193,483; Serial No. 333,647 filed December 26, 1963 and now Patent Number 3,193,481 and Serial No. 337,540 filed January 14, 1964, and now Patent Number 3,193,482. The conditions taught in the referred-to applications for hydrodimerization are suitable for hydrodimerizations or other reductive couplings of the present invention.

Electrolysis, of course, has been practiced for many years and numerous materials suitable as electrolytes are known, making it within the skill of those in the art in the light of the present disclosure to select electrolytes for reductive coupling according to the present invention. As discussed in my aforesaid copending applications, some olefinic compounds are subject to polymerization or other side reactions if the electrolyte is acidic, or excessively alkaline, and it will be necessary in such cases to conduct the reductive coupling in solutions which are not overly acidic and also in some cases below a pH at which undesirable side reactions occur, e.g., below about 12. To minimize polymerization, simple reduction of the olefinic bond and other side reactions, the pH is usually maintained in the range of about 3 to about 12, preferably 6 to 9.5.

When the catholyte during electrolysis is acidic, it will generally be advisable to conduct the electrolysis under conditions which inhibit polymerization of the reactants involved or in the presence of a polymerization inhibitor, for example, in an atmosphere containing sufficient oxygen to inhibit the polymerization in question, or in the presence of inhibitors effective for inhibiting free radical polymerization. Classes of inhibitors for inhibiting free radical polymerizations are well known, e.g., such inhibitors as hydroquinone, p,t-butyl catechol, quinone, p-nitrosodimethylaniline, di-t-butyl hydroquinone, 2,5-dihydroxy-1,4-benzoquinone, 1,4-naphthoquinone, chloranil, 9,10-phenanthraquinone, 4-amino-1-naphthol, etc., are suitable.

In effecting the reductive coupling of the present invention it is preferred to utilize a cathode having an overvoltage greater than that of copper and to subject to electrolysis in contact with such cathode a concentrated solution of a mixture of the defined olefinic compounds in an aqueous electrolyte under mildly alkaline conditions. In effecting the reductive couplings of the present invention, it is essential to obtain cathode potentials required for such couplings and therefore the salt employed should not contain cations which are discharged at numerically lower, i.e., less negative, cathode potentials, but rather the electrolyte should have a half-wave potential substantially more negative than that at which the desired dimerization occurs. It is desirable that the salt employed have a high degree of water solubility to permit use of very concentrated solutions, for concentrated salt solutions dissolve greater amounts of the organic olefinic compounds.

In addition to the foregoing considerations, a number of other factors are important in selecting salts suitable for good results. For example, it is undersirable that the salt cation form an insoluble hydroxide at the operating pH, or that it discharge on the cathode forming an alloy which substantially changes the hydrogen overvoltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form insoluble acids and clog the pores of the membrane. Alternatively the use of an ion exchange membrane effectively separates catholyte and anolyte and the use of different anions in the two chambers may minimize any difficulties a particular anion would cause in one of the chambers.

Aside from considerations of selecting electrolyte salts for optimum results, all that is necessary for the present process is a supporting electrolyte as understood by those in the art, i.e., electrolyte capable of carrying current but not discharging under the electrolysis conditions. As the hydrodimerization of 1-cyano-1,3-butadiene, for example, proceeds at cathode voltages which are not exceptionally negative, e.g., −1.49 to −1.62 volts (vs. saturated calomel electrode), any electrolyte salts not subject to substantial discharge at less negative voltages can be employed and perhaps those containing cations discharging at −1.3 or so volts (vs. saturated calomel electrode) would not interfere excessively. Thus, extensive classes of suitable electrolyte salts are available for use. The salts can be organic or inorganic, or mixtures of such, and composed of simple cations and anions or very large complex cations and anions. In general amine and quaternary ammonium salts are suitable for use in the present process. Alkali and alkaline earth metal salts can also be used, although the alkali metals are somewhat more subject to interfering discharge, and the alkaline earth metal salts tend to have poor water solubility.

The electrolytic reductive couplings of the present invention are conducted in solution in electrolyte, generally in fairly concentrated solution in an aqueous electrolyte. It will be recognized that as used herein an electrolyte is considered aqueous even if the amount of water is small. Many electrolytes can be employed in the present invention but some are less suitable than others. The salts employed, either to provide conductivity or to increase solubility of the reactants have an important bearing on the electrolysis and will be be discussed at length below. The acidity or basicity is also significant, neutral or mildly alkaline solutions generally being preferred. Some olefinic compounds tend to polymerize when electrolyzed in strongly acidic solution, such as solutions of mineral acids, making it desirable to operate at pH's above about 5 or 6, such as provided by solutions of salts of strong bases. Moreover, the hydrogen ion has a cathode discharge potential of about −1.5 volts, making it desirable to avoid high concentrations of hydrogen ion in the catholyte if the reductive coupling occurs at similar or more negative cathode potentials. The reductive couplings can suitably be conducted at pH's higher than those at which substantial polymerization of olefinic compound occurs, or higher than pH's at which there is undue generation of hydrogen, for example pH's at which more than half the current is expended in discharging hydrogen ions. The pH's referred to are those obtaining in the bulk of the catholyte solution, such as determinable by a pH meter on a sample of the catholyte removed from the cell. The electrolysis in effect generates acid at the anode and base at the cathode; it will be recognized that in an undivided cell the pH in the immediate vicinity of the cathode may differ considerably from that near the anode, particularly if good stirring is not employed. To some extent the effects of acidity can be counteracted by high current density to cause more rapid generation of hydroxyl ions. However, high current densities also require good stirring or turbulence to move the reactants to the cathode.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g., glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When a divided cell is employed, it will often be desirable to use an acid as the anolyte, any acid being suitable, particularly dilute mineral acids such as sulfuric or phosphoric acid. Hydrochloric acid can be employed but would have the disadvantage of generating chlorine at the anode, and of being more corrosive with respect to some anode materials. When an acid is employed as anolyte, it is advantageous to use an ion exchange membrane to separate the anolyte from the catholyte. If desired, a salt solution can be used as anolyte, those useful as catholyte also being suitable as anolyte, although there are many other salt solutions suitable for such use.

Materials suitable for constructing the electrolysis cell employed in the present process are well known to those skilled in the art. The electrodes can be of any suitable cathode and anode material. The anode may be of virtually any conductor, although it will usually be advantageous to employ those that are relatively inert or attacked or corroded only slowly by the electrolytes; suitable anodes are, for example, platinum, carbon, gold, nickel, nickel silicide, Duriron, lead and lead-antimony and lead-copper alloys, and alloys of various of the foregoing and other metals.

Any suitable material can be employed as cathode, various metals and alloys being known to the art. It is generally advantageous to employ metals of fairly high hydrogen overvoltage in order to promote current efficiency and minimize generation of hydrogen during the electrolysis. In general it will be desirable to employ cathodes having overvoltages at least about as great as that of copper, as determined in a 2 N sulfuric acid solution at current density of 1 milliamp/square centimeter (Carman, Chemical Constitution and Properties of Engineering Materials, Edward Arnold and Co., London, 1949, page 290). Suitable electrode materials include, for example, mercury, cadmium, tin, zinc, bismuth, lead, graphite, aluminum, nickel, etc., in general those of higher overvoltage being preferred, although those of lower hydrogen overvoltage can also be employed, even if they cause generation of hydrogen under the electrolysis conditions, as is the case with stainless steel and other electrodes of lower hydrogen overvoltage. It will be realized that overvoltage can vary with the type of surface and prior history of the metal as well as with other factors; therefore the term overvoltage as used herein with respect to copper as a gauge has reference to the overvoltage under the conditions of use in electrolysis.

Among the salts which can be employed according to the invention for obtaining the desired concentration of dissolved olefinic compound, the amine and quaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or tri-alkanolamine salts, or the piperidine, pyrrolidine or morpholine salts, e.g., the ethylamine, dimethylamine or triisopropylamine salts of various acids, especially various sulfonic acids. Especially preferred are aliphatic and heterocyclic quaternary ammonium salts, i.e., the tetraalkylammonium or the tetraalkanolammonium salts or mixed alkyl alkanol ammonium salts such as the alkyltrialkanolammonium, the dialkyldialkanolammonium, the alkanotrialkylammonium or the N-heterocyclic N-alkyl ammonium salts of sulfonic or other suitable acids. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed (as also can aryl sulfonate anions).

Among the anions useful in the electrolytes, the aryl and alkaryl sulfonic acids are especially suitable, for example, salts of the following acids: benzenesulfonic acid, o-, m- or p-toluenesulfonic acid, o-, m- or p-ethylbenzenesulfonic acid, o-, m- or p-cumensulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5 sulfonic acid, mesitylene-2-sulfonic acid, durene-3-sulfonic acid, pentamethylbenzenesulfonic acid, o-dipropylbenzene-4-sulfonic acid, alpha- or beta-naphthalenesulfonic acid, o-, m- or p-biphenylsulfonic acid, and alpha-methyl-beta-naphthalenesulfonic acid. Alkali metal salts are useful in the present invention with certain limitations, and the alkali metal salts of such sulfonic acids can be employed, i.e., the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g., the mono-, di- or trialkylamine salts, or the mono-, di- or trialkanolamine salts, or the piperidine, pyrrolidine, or morpholine salts, e.g., the ethylamine, dimethylamine or triisopropylamine salt of benzenesulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid, the piperidine salt of alpha- or beta-naphthalenesulfonic acid or of the cumenesulfonic acids; the pyrrolidine salt of o-, m- or p-amylbenzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the presently provided invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o- or m-toluenesulfonate or benzenesulfonate; tetraethylammonium o-, m- or p-cumenesulfonate or o-, m- or p-ethylbenzenesulfonate, tetramethylammoniumbenzenesulfonate, or o-, m- or p-toluenesulfonate; N,N-di-methyl-piperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate, or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium alpha- or beta-naphthalenesulfonate or o-, m- or p-butylbenzenesulfonate, trimethylethanolammonium benzenesulfonate or o-, m- or p-toluenesulfonate; N,N-di-ethylpiperidinium or N-methyl-pyrrolidinium o-, m- or p-hexylbenzenesulfonate or o-, m- or p-toluenesulfonate, N,N-di-isopropyl, or N,N-di-butylmorpholinium o-, m- or p-toluenesulfonate or o-, m- or p-biphenylsulfonate, etc.

Among the ammonium and amine sulfonates useful as electrolytes in the present invention are the alkyl, aralkyl, and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and polyamines and di- and poly-ammonium radicals are operable and included by the terms amine and ammonium. The sulfonate radical can be from aryl, alkyl, alkaryl or aralkyl sulfonic acids of various molecular weights up to for example 20 carbon atoms, preferably about 6 to 20 carbon atoms, and can include one, two or more sulfonate groups. Any of the quaternary ammonium sulfonates disclosed and claimed in my copending application, S.N. 75,123, filed December 12, 1960, can suitably be employed.

Another especially suitable class of salts for use in the present invention are the alkylsulfate salts such as methosulfate salts, particularly the amine and quaternary ammonium methosulfate salts. Methosulfate salts such as the methyltriethylammonium, tri-n-propylmethylammonium, triamylmethylammonium, tri-n-butylmethylammonium, etc., are very hygroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Various other cations are suitable for use in the present invention, e.g., tetraalkylphosphonium and trialkylsulfonium cations, particularly as sulfonate salts formed from sulfonic acids as described above, or as methosulfate salts.

Various other quaternary ammonium, tetraalkylphosphonium or trialkylsulfonium salts can be employed, e.g., the halides, sulfates, phosphates, acetates and other carboxylic acid salts, benzoates, phosphonates, etc., and similarly the alkali, alkaline earth and other metal salts with the foregoing anions can be employed, e.g., sodium, chloride, potassium phosphates, sodium acetate, lithium benzoate, calcium chloride, rubidium bromide, magnesium chloride, etc. The alkali, alkaline earth, and other metal salts of sulfonic acids and alkylsulfuric acids can also of course be employed.

*Example 1*

A catholyte was prepared by dissolving 100 grams 1-cyano-1,3-butadiene containing a trace of p-nitrosodimethylaniline in 100 grams of aqueous tetraethylammonium p-toluenesulfonate (80% by weight of salt) and 20 ml. acetonitrile. As anolyte, the sulfonate solution was employed in an Alundum cup. The anode was platinum and the cathode 110 ml. mercury having a 55 cm.² surface. Current of about 3 amperes was applied for 12.1 ampere-hours at a cathode voltage of −1.49 to −1.59 (vs. saturated calomel electrode). The catholyte was diluted with water and the reactants and products separated therefrom by successive extractions with methylene chloride. After removal of solvent and starting materials, there remained a residue of 39.4 grams. Vacuum distillation yielded 29.1 grams of hydrodimers (80.5% yield of hydrodimers based on current input) boiling mainly at 130° C./0.15 mm. to 132° C./0.34 mm. and 1.9 grams boiling at 187° C./0.30 mm. Analysis of the main fraction (containing the various stereoisomers): Calcd. for 1,8-dicyanoocta-2,6-diene: C, 74.96; H, 7.55; N, 17.48; mol. wt. 160. Found: C, 74.67; H. 7.26; N. 17.27; mol. wt. 163. The compound crystallized extensively in a short time and upon crystallizing from methanol gave 15.8 grams of the 1,8-dicyano-octa-2,6-diene, M.P. 49–50. Anal. Found: C, 74.74; H, 7.74; N, 17.54; mol. wt. 163. A 6.64 gram sample of the diene product was subjected to hydrogenation under mild conditions, a Parr shaker at 40 lbs. being employed with 0.4 gram of 5% palladium on carbon catalyst, and the desired hydrogenation being complete in 10 minutes to give sebaconitrile as product, distilling at 162–164° C./4–5 mm., $n_D^{25}$ 1.4458, and having an infrared spectrum superimposable upon that of a known sample of sebaconitrile.

*Example 2*

In accordance with the procedure of Example 1, 95.5 grams of 1-cyano-1,3-butadiene in 107 grams of 75% tetraethylammonium p-toluenesulfonate was electrolyzed at 25–55° C. for 12.4 ampere-hours. The cathode voltage was −1.55 to −1.62 volts (vs. saturated calomel electrode). After isolation of the organic materials and removal of low boiling materials as in Example 1, a 35.4 gram residue was obtained, which was then hydrogenated according to the procedure in Example 1, but with replenishment of catalyst as necessary to give a 32.8 gram yield of crude hydrogenated nitriles. Of the crude product, 78% distilled in the range expected for sebaconitrile and isomers, and vapor phase chromatographic analysis of the distillate indicated 86.7% sebaconitrile, 4.7% of 3,4-diethyladiponitrile and 2.8% and 2.6% of two additional components. Material which had not distilled at 143°/0.13 mm., $n_D^{25}$ 1.4752, had carbon, hydrogen, nitrogen and molecular weight values in accord with those for a hydrogenated hydrotetramer of 1-cyano-1,3-butadiene.

*Example 3*

In an electrolysis similar to that of Example 1, a 32.5 gram amount of hydrodimers was obtained (88% yield based on current) and hydrogenation and distillation gave 32.5 grams of saturated dinitriles, distilling at 126–133°/0.25 mm., $n_D^{25}$ 1.4521, of which 76.7% was shown to be sebaconitrile by vapor phase chromatographic analysis.

What is claimed is:
1. The method of producing a reduced coupled product which comprises subjecting a solution of substantial amounts of 1-cyanobutadienes represented by the formula:

RCH=CH—CH—CH—CN in which R is selected from the group consisting of hydrogen, alkyl, cycloalkyl and aryl hydrocarbon groups and contains no more than 10 carbon atoms to electrolysis in contact with a cathode in aqueous solution containing at least 5% by weight of supporting electrolyte salt, causing development of the cathode potential required for reductive coupling, and separating the reduced, coupled product from the solution.

2. The method of claim 1 in which the solution comprises a salt selected from the group consisting of amine and ammonium sulfonates and alkyl sulfates.

3. The method of claim 2 in which the salt is tetraethylammonium p-toluenesulfonate.

4. The method of claim 3 in which 1-cyano-1,3-butadiene is converted to 1,8-dicyano-octa-2,6-diene.

5. The method of claim 1 in which 1-cyano-1,3-butadiene is hydrodimerized and 1,8-dicyano-octa-2,6-diene obtained.

6. The method of hydrodimerization which comprises subjecting a conductive aqueous solution of 1-cyano-butadienes represented by the formula:

RCH=CH—CH—CH—CN in which R is selected from the group consisting of hydrogen, alkyl, cycloalkyl and aryl hydrocarbon groups and contains no more than 10 carbon atoms to electrolysis in contact with a cathode having a hydrogen overvoltage greater than that of copper, causing the development of the cathode potential required for hydrodimerization, the solution containing at least about 10% by weight of the cyanobutadienes, at least 5% of an electrolyte salt which has a half-wave potential substantially more negative than that at which the hydrodimerization occurs and having a pH above about 6, and recovering the hydrodimerized product.

7. The method of obtaining sebaconitrile which comprises hydrodimerizing 1-cyano-1,3-butadiene by electrolysis in aqueous salt solution containing at least 5% by weight of supporting electrolyte salt in contact with a cathode causing development of the cathode potential required for hydrodimerization, and hydrogenating the resulting product containing hydrodimers under mild conditions to reduce olefinic bonds, and obtain substantial amounts of sebaconitrile.

References Cited by the Examiner
UNITED STATES PATENTS
3,205,154   9/1965   Mador et al. _____ 204—74

WINSTON A. DOUGLAS, *Primary Examiner.*

H. M. FLOURNOY, *Assistant Examiner.*